Sept. 24, 1957
R. B. LEW
2,807,262
PERFORATED PLASTIC ADHESIVE TAPE BANDAGE
Filed Dec. 10, 1952
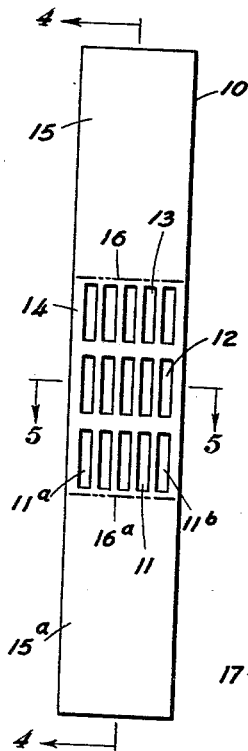
Fig. 1
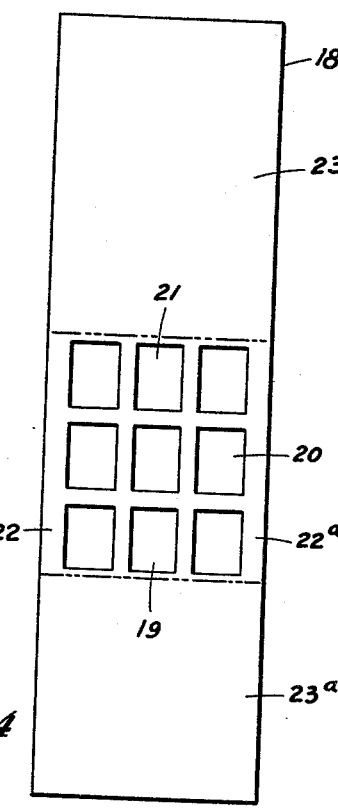
Fig. 4
Fig. 2
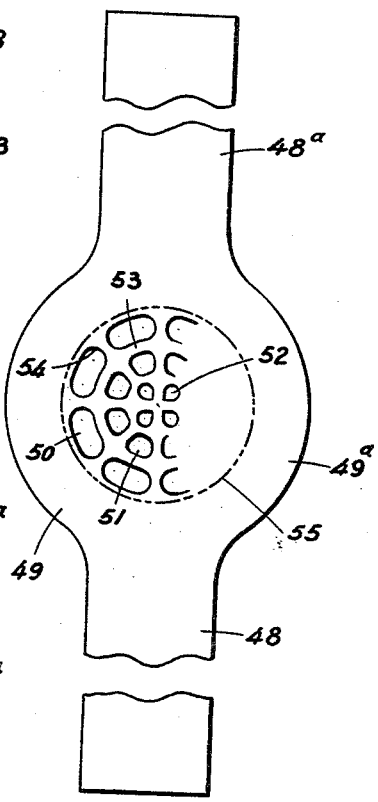
Fig. 8
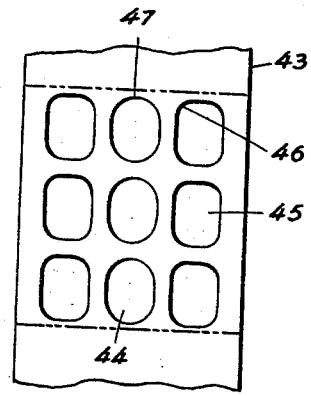
Fig. 6
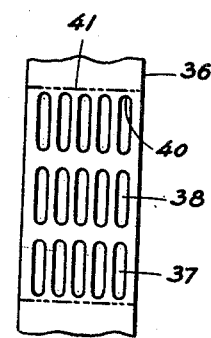
Fig. 7
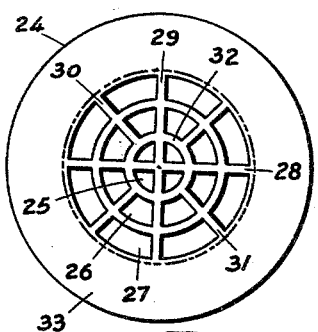
Fig. 3
DR. ROBERT B. LEW
INVENTOR.
ATTORNEY United States Patent Office 2,807,262
Patented Sept. 24, 1957

2,807,262
PERFORATED PLASTIC ADHESIVE TAPE BANDAGE

Robert B. Lew, Brooklyn, N. Y.

Application December 10, 1952, Serial No. 325,138

5 Claims. (Cl. 128—156)

The invention relates to bandages and is particularly directed to bandages in the form of tapes, which are attached to various parts of the human body for covering and healing open cuts and wounds of various types.

In the conventional type of adhesive tape or bandage used for covering open wounds on various parts of the body, medication is applied to the wound by the application of a gauze or other type of pad soaked in or coated with medication in liquid or paste form, after which adhesive tape is applied to cover the wound and the medicated pad applied thereto.

In order to renew the medicated pad, or apply additional medication thereto, it is necessary to completely remove the adhesive tape or other covering and the medicated pad, thereby reopening the wound, exposing it to the atmosphere, as well as the fingers of the user, after which additional medication is applied and the medication covered by a new coating of adhesive tape in one form or another.

The object of my invention is to provide and adhesive tape bandage which can be applied to any part of the body, the bandage remaining in place from the time of initial application until the wound is completely healed.

A primary feature of the invention resides in the fact that the material of the bandage has rows of perforations cut therethrough to enable medication to be applied to the wound while the bandage is in place, thus avoiding the necessity for removing the bandage until the wound is completely healed.

Another object is to provide a bandage made of an elastic plastic material impervious to ordinary liquids, so that it can be stretched to some extent when applied and will flex readily, thereby following the movement of the part of the body to which it is applied, and enabling the bandage to snugly adhere to the skin and remain in place for a sustained period.

A further feature of the bandage is the fact that the solid area thereof can be washed or wetted in any other manner, the waterproof plastic material, and the waterproof adhesive composition used in conjunction therewith, being unaffected by the moisture and adhering to the portion of the body to which the bandage is attached.

Another feature of the invention lies in the fact that it can be produced in a wide range of sizes and types, with a wide range of sizes and forms of perforations, so that they are suitable for selective application to various parts of the body and various sizes and type of cuts and wounds.

The accompanying drawings, illustrating one embodiment of my invention, and several modifications thereof, together with the description of their construction and the method of application and utilization thereof, will serve to clarify further objects and advantages of my invention.

In the drawings:

Fig. 1 is a plan view of one embodiment of the tape in rectangular form, with a plurality of rows of rectangular perforations cut through the central portion thereof.

Fig. 2 is a plan view of the tape, similar to Fig. 1, of a greater width with rows of larger perforations cut through the central portion thereof.

Fig. 3 is a plan view of another form of tape, of circular contour, with a plurality of rows of circular segmental apertures cut through the central portion thereof.

Fig. 4 is a vertical section through the tape, shown in Fig. 1, taken at 4—4, Fig. 1.

Fig. 5 is an enlarged cross-section through the perforated section of the tape shown in Fig. 1, taken at 5—5, Fig. 1.

Fig. 6 is a plan view of a modification of the central portion of the tape shown in Fig. 2, the contour of the openings therethrough being modified.

Fig. 7 is a modification of the central portion of the tape shown in Fig. 1, the contour of the openings therethrough being modified.

Fig. 8 is a plan view of a modification of the tape shown in Fig. 3, the outer contour being modified by the addition of rectangular extensions at both ends thereof, the contour of the circular segmental apertures being modified.

It will be understood that the following description of the construction and the method of application and utilization of the perforated plastic adhesive bandage is intended as explanatory of the invention and not restrictive thereof.

In the drawings, the same reference numerals designate the same parts throughout the various views.

One embodiment of the construction, shown in Figs. 1, 4 and 5 comprises a thin rectangular strip or band 10, formed of an elastic sheet plastic material, such as synthetic rubber in one of several compositions, polyethylene or a similar material, the material being impervious to water, and liquids of various types, and highly elastic.

A plurality of rows of narrow rectangular slots or apertures 11, 12 and 13, are cut through the central portion of the band 10, the width of the strip 14 at the sides of the band, adjacent the end apertures 11a, 11b, being greater than the spacing between adjoining intermediate slots or apertures.

One surface of the solid sections 15, and 15a of the band, between the ends thereof and the dot-dash lines 16, 16a, Fig. 1, adjacent the outer ends of the outer rows of apertures 11 and 13, is coated with a gummy substance, a plastic material, or any type of adhesive material 17, which in its normal moist state will readily adhere to human skin, the adhesive being flexible even after it dries so that it readily follows the movement of the band 10 and the part of the body to which it is applied. The adhesive material employed would be of such a composition that it is moisture repellant when dried, so that it will adhere to the skin in the presence of moisture.

The central perforated portion of the band, between the lines 16 and 16a, is left ungummed so as to clear the wound or any liquid, or other type of medication that is applied through the rectangular slots 11, 12 and 13, the plastic material being impervious to all ordinary liquids.

In practice, a sheet of thin gauze or similar material (not shown) would be applied to the gummed surfaces 15 and 15a of the band to retain the gummed surfaces in a moist condition until they are applied to the body.

In a modification of the band, shown in Fig. 2, a wider band 18 of the same or a similar elastic plastic sheet material is utilized, the rows of openings 19, 20 and 21, of rectangular cross-section, being wider than those shown in Fig. 1, to allow the band to be applied to larger cuts or wounds, the wider openings allowing larger quantities of medication to be applied through the openings.

The width of the end strips 22 and 22a, adjacent the end openings, is wider than the spacing between the central and end openings to provide greater strength at the sides of the band, when it is stretched, upon application to the body.

One face of the solid end sections 23 and 23a, between the ends of the band and the edge of the outer rows of openings 19 and 21, is coated with a flexible adhesive material in substantially the same manner as the band shown in Fig. 1, to enable the end sections to be applied to a portion of the body, the adhesive material adhering readily to the skin when it is dried and being flexible enough to flex with the skin and the band attached thereto. The adhesive employed would be of a composition which is water repellant when dried, so that it will adhere to the skin even when the skin is moistened.

In another modification of the bandage, shown in Fig. 3 a piece of flexible plastic material of substantially circular outer contour 24 is utilized, a plurality of circular segmental cut-outs 25, 26 and 27 being cut through the central portion thereof.

In the arrangement shown in Fig. 3, a plurality of longitudinal ribs 28 and cross ribs 29 integral with the circular disk, are formed between adjacent central cut-outs, with additional diagonal ribs 30 and 31 located between the outer circumference of the central circular land 32, adjacent the inner cut-outs, and the edge of the solid section of the material, adjacent the outer circular segmental cut-outs 27, as indicated in Fig. 3.

By forming a series of relatively equally spaced circular segmental cut-outs between the solid outer rim section 33 of the substantially circular disk and the center thereof, adequate space is provided for the application of medication to wounds on various parts of the body.

The solid outer rim 33 of the circular disk, adjacent the outer cut-outs 27, has a flexible adhesive material applied to one face thereof, in the same manner as the bands shown in Figs. 1 and 4, the adhesive material being moist in its normal state so that it will readily adhere to the skin, the adhesive material, when dried, adhering to the skin and possessing a sufficiently high degree of flexibility to enable it to follow the movement of the bandage 24 and the flexing of the portion of the body to which it is applied. The adhesive material employed would be of such a composition that it is moisture repellant when dried, so that it will adhere to the skin even in the presence of moisture.

The central portion of the circular bandage, inside the adhesive coated rim 33, is left uncoated so that it will not interfere with the application of medication to an open wound.

In a modification of the band of Fig. 1, shown in Fig. 7, the band 36 is of similar size and cross-section, made of the same elastic plastic sheet material.

The rows of cut-outs or apertures 37 and 38, cut through the central portion of the band are of essentially the same width and length as those shown in Fig. 1, the extremities 40 of each of the cut-outs being of semi-circular or other arcuate form, to more uniformly divide the load imposed on the solid areas adjacent the end cut-outs, over the areas between adjoining intermediate cut-outs when the band is stretched in applying it to the human body.

One face of both ends of the band 36 is coated with a flexible gum or other adhesive material, which is flexible when dried, in the same manner as the band shown in Fig. 1, the adhesive being applied from the ends of the strip to lines adjoining the outer cut-outs, the inner extremities being indicated by dot-dash lines 41, shown in Fig. 7. The adhesive material employed would be of such a composition that it is moisture repellant when dried, so that it will readily adhere to the skin in the presence of moisture.

In a modification of the central portion of the band of Fig. 2, shown in Fig. 6, the band 43 is of rectangular contour, the width and length being substantially the same as that shown in Fig. 2.

Three rows of perforations 44 and 45, the width and length of which are essentially the same as those shown in Fig. 2, are cut through the central portion of the band.

The outer ends of the perforations may be relatively flat with radii 46, formed at both ends thereof, as shown in the side perforations, Fig. 6, or both ends may be rounded 47, to either semi-circular or other arcuate form, in the manner shown in the central line of perforations, Fig. 6, to more uniformly distribute the load from the ends of the band to the outer areas adjacent the end cut-outs, and the lands between adjacent interior cut-outs, when the band is stretched in applying it to a part of the body.

One face of the solid sections of the band from the ends thereof to a point adjacent the ends of the outer cut-outs is coated with a flexible adhesive material in the same manner as the band shown in Fig. 2.

In a modification of the circular bandage shown in Fig. 3, as indicated in Fig. 8, a pair of substantially rectangular extension strips 48 and 48a adjoin the outer ends of the inner circular section, a pair of circular segmental areas 49 and 49a projecting beyond the sides of the rectangular extension strips at substantially the center of the band.

A plurality of substantially parallel rows of circular segmental cut-outs 50, 51 and 52 are cut through the central portion of the band in the same manner as those shown in Fig. 3. The longitudinal ribs, and the cross ribs between the circular segmental cut-outs 50 and 51, and the diagonal ribs between adjacent cut-outs, are essentially the same as those shown in Fig. 3, the circular arcuate sections 53 between the rows of segmental cut-outs being similar to those shown in Fig. 3. The corners of the outer segmental cut-outs 50 and 51 are rounded 54 as indicated in Fig. 8, to more uniformly distribute the tension transmitted from the rectangular extension strips 48 and 48a of the band to the band areas between the cut-outs.

One face of the outer circular segmental area, and the rectangular extension strips of the band, surrounding the dot-dash circle 55, adjacent the cut-outs, shown in Fig. 8, is coated with a flexible adhesive material, which retains its flexibility when dried, in the same manner as those shown in Figs. 2 and 3, the band being applied to portions of the body in essentially the same manner. The adhesive material employed would be of such a composition that it is moisture repellant when dried, so that it will readily adhere to the skin even in the presence of moisture.

The outer corners of the inner substantially triangular cut-outs 52 of the band are rounded in essentially the same manner as the circular segmental cut-outs 50 and 51.

The band shown in Fig. 8, may be applied to an injured part of the body in the same manner as those shown in Figs. 1 and 2, the wider central portion enabling it to be used for covering larger cuts or wounded areas.

The bands shown in Figs. 1, 2 and the circular disc shown in Fig. 3 may be applied directly to an open cut or wound, either before or after medication in liquid or paste form is applied to the wound, the cut-outs in the central portion of the band or the disc respectively, and the uncoated areas surrounding them enabling the user to apply additional medication through the cut-outs after the gummed areas are attached to the skin.

After the medication is applied, the central portion of the band or disc, may be covered by adhesive tape, or other suitable covering to cover the cut-outs and seal the wounded area.

After the bands shown in Fig. 1, 2 and the disc, shown in Fig. 3 are applied to the skin, additional medication may be applied through the cut-outs in the central portion of the band or disc, respectively, without removing the band or the circular disc from the portion of the body to which it is applied.

This enables the same band or disc to be left on the injured part of the body until the wound or cut is completely healed, thereby avoiding the necessity of replacing the band or disc each time the wound is to be dressed, thus facilitating the healing of the injury, as the injured area is not opened by the frequent removal of the band or disc, which remains in place until the wound is healed.

While the outer coating of adhesive tape or other similar material, covering the central portion of the band or disc, is removed and replaced each time fresh medication is applied, the band and the wound it covers are not affected, as the band or disc, remains in place for a sustained period.

In all instances where a plurality of rows of apertures or slots is specified herein, a single row of slots of essentially the same form may be utilized where the requirements of a particular application or expediency so dictates, with a particular size, or sizes of band, the essentials of the construction in all other respects remaining the same.

The size of the bands shown in Figs. 1 and 2 may be varied considerably, depending upon the portion of the body on which they are to be used, the central portion in which the cut-outs are located being similarly altered.

The number and size of the cut-outs may also be varied considerably depending upon the type of application for which they are to be used, the width ranging from the multiplicity of narrow rectangular cut-outs shown in Figs. 1 and 7, to the smaller number per row of wider cut-outs shown in Figs. 2 and 6, the number of cut-outs per row and the width of the individual cut-outs being regulated by the width of the band and the gap between adjacent cut-outs.

The number of circumferential rows of cut-outs, shown in Figs. 3 and 8, may be varied considerably depending upon the height of the cut-outs required and the outside diameter of the bandage.

It will be apparent to one skilled in the art that applicant's principles may be applied in many modified forms and therefore the following claims should not be limited to the forms illustrated but be deemed to apply to all equivalents as well.

What I claim is:

1. A surgical bandage comprising a band, having a substantially circular central portion, with integral substantially rectangular sections extending beyond the central portion, made of a flexible plastic sheet material, the central portion of said band having a plurality of radially spaced arcuate rows of apertures therethrough, the undersurface of the rim of said band, beyond said apertures, having a normally moist adhesive coating thereon, the adhesive coating retaining its flexibility when dried.

2. A surgical bandage formed of a substantially circular central portion of flexible plastic material, with integral substantially rectangular sections extending beyond the central portion, the central portion of said bandage having a plurality of substantially arcuate rows of radially spaced, oval cutouts therethrough, with integral spacing sections separating said cutouts, the undersurface of the rim of said bandage, and the rectangular sections beyond said cutouts, having a water resistant resilient adhesive coating thereon, the adhesive coating retaining its resiliency when dried.

3. A surgical bandage comprising a substantially rectangular band, formed of a flexible plastic sheet material, the central portion of said band having integral circular segmental sections projecting beyond the sides thereof, the interior of the central portion of said band having a plurality of substantially parallel arcuate rows of radially spaced, substantially circular segmental apertures therethrough, the undersurface of the portion of said band around the apertures having a normally moist flexible adhesive coating thereon, the adhesive coating retaining its flexibility when dried.

4. A surgical dressing comprising a band of rectangular contour, formed of an elastic plastic sheet material, the central portion of said band having integral circular segmental sections projecting beyond the ends thereof, the central portion of said band having a plurality of substantially parallel arcuate of rows of radially positioned oval apertures therethrough, the corners of said apertures being rounded, the undersurface of the portions said band extending beyond said apertures, having a water resistant resilient adhesive coating thereon, said adhesive retaining its resiliency when dried.

5. A surgical dressing formed of an elastic plastic sheet material, comprising a substantially circular central portion with a pair of substantially rectangular extensions projecting longitudinally beyond the central section, the inner area of said central section having a plurality of rows of substantially parallel radially located, substantially circular segmental apertures therethrough, with integral arcuate spacers between said apertures, a plurality of integral, substantially radial ribs separating said apertures, the corners of said apertures being rounded, the undersurface of the portion of said band around the apertures having a normally moist flexible adhesive coating thereon, the adhesive coating retaining its flexibility when dried.

References Cited in the file of this patent

UNITED STATES PATENTS

| 2,054,768 | Gale Jr. | Sept. 15, 1936 |
| 2,292,995 | Greenwoll | Aug. 11, 1942 |
| 2,484,045 | Morgan | Oct. 11, 1949 |

FOREIGN PATENTS

| 9,788 of 1911 | Great Britain | Feb. 22, 1912 |